United States Patent [19]

Takitani et al.

[11] 4,442,225
[45] Apr. 10, 1984

[54] CATALYTIC COMPONENT FOR POLYMERIZATION OF α-OLEFIN AND METHOD FOR HOMO- OR CO-POLYMERIZATION OF α-OLEFIN

[75] Inventors: Masaru Takitani; Shizuo Tomiyasu; Keikichi Baba, all of Shinnanyo, Japan

[73] Assignee: Toyo Stauffer Chemical Co., Ltd., Tokyo, Japan

[21] Appl. No.: 386,587

[22] Filed: Jun. 9, 1982

[30] Foreign Application Priority Data

Jun. 11, 1981 [JP]  Japan ................................. 56-89858

[51] Int. Cl.$^3$ ............................................... C08F 4/64
[52] U.S. Cl. ..................................... 502/112; 502/115; 502/122; 502/123; 502/126; 502/127; 502/128; 502/119; 526/119; 526/125; 526/142
[58] Field of Search ..................................... 252/429 B

[56] References Cited

U.S. PATENT DOCUMENTS

| | | | |
|---|---|---|---|
| 3,094,568 | 6/1963 | Hay et al. | 252/429 B X |
| 4,115,319 | 9/1978 | Scata et al. | 252/429 B |
| 4,123,386 | 10/1978 | Avaro et al. | 252/429 B |
| 4,143,223 | 3/1979 | Toyota et al. | 252/429 B X |
| 4,220,554 | 9/1980 | Scata et al. | 252/429 B |
| 4,242,229 | 12/1980 | Fujuii et al. | 252/429 B |
| 4,252,670 | 2/1981 | Caont et al. | 252/429 B |
| 4,329,252 | 5/1982 | Gavens et al. | 252/429 B |

FOREIGN PATENT DOCUMENTS 2033409A  5/1980  United Kingdom .

*Primary Examiner*—Patrick Garvin
*Attorney, Agent, or Firm*—Armstrong, Nikaido, Marmelstein & Kubovcik

[57] ABSTRACT

A catalytic component for polymerization of an α-olefin is prepared through a process wherein a solid product obtained by allowing an organo-magnesium compound or a mixture of an organo-magnesium compound and an organo-aluminum compound or their reaction product to react, in the presence of an electron donor and an α-olefin, with a mixture of a halogenating agent other than a halogenated titanium compound and a titanium compound or their reaction product is treated with an alcohol and/or a phenol. The treated product may be further treated with a halogenated titanium compound. Homo- or co-polymerization of an α-olefin is carried out in the presence of a catalyst composition consisting of the catalytic component and an organo-aluminum compound or with a concomitant electron donor used together with the catalyst composition.

5 Claims, No Drawings

CATALYTIC COMPONENT FOR POLYMERIZATION OF α-OLEFIN AND METHOD FOR HOMO- OR CO-POLYMERIZATION OF α-OLEFIN

BACKGROUND OF THE INVENTION

This invention relates to a novel Ziegler type supported catalytic component for α-olefin polymerization which is of highly uniform particle diameter, of good fluidity, not readily disintegrating and has a high degree of polymerizing activity, high stereospecific polymer productivity and high bulk density (hereinafter will be called the catalytic component for short unless otherwise specified) and to a method of carrying out homo- or co-polymerization (hereinafter will be called (co-) polymerization) of an α-olefin in the presence of a catalyst composition consisting of the above stated catalytic component and an organo-aluminum compound.

More particularly, the invention relates to a catalytic component for α-olefin polymerization prepared by treating, with alcohol and/or phenol, a solid product obtained by allowing an organo-magnesium compound or a mixture of an organo-magnesium compound and an organo-aluminum compound or their reaction product to react, in the presence of an electron donor and an α-olefin, with a mixture of a halogenating agent other than a halogenated titanium compound and a titanium compound or their reaction product or by further treating the treated matter with a halogenated titanium compound. The invention also relates to a method for (co-) polymerization of an α-olefin which is carried out either in the presence of a catalyst composition consisting of the catalytic component thus obtained and an organo-aluminum compound or with use of a concomitant electron donor compound together with the catalyst composition.

An important feature of the present invention resides in that the weight of the polymer product obtainable in accordance with the invention is large per unit weight of the catalytic component and titanium atoms, that is, the catalytic component has a high degree of polymerizing activity. Other important features include that: The insufficient bulk density and the insufficient stereospecific polymer productivity which have represented the shortcomings of the conventional carrier catalytic components of the Ziegler type can be substantially improved. Besides, both the invented catalytic component and the polymer obtained therefrom are in a spherical particle shape and are of highly homogeneous particle diameter to result in good fluidity.

Generally, the catalysts which have been used for the manufacture of stereospecific α-olefin polymers are of the type known by the name of a Ziegler-Natta catalyst consisting of a transition metal belonging to the groups IV–VI of the periodic table and an organo-metallic compound of a metal belonging to the groups I–III of the periodic table.

Catalytic components that have been employed in the industrial manufacture of α-olefin polymers such as propylene, butene-1, etc. include an α-olefin polymerizing catalytic component comprising a titanium trichloride composition as a compound of the transition metal belonging to the groups IV–VI of the periodic table or a magnesium-containing halide which is used as carrier to have titanium tetra-chloride carried thereby; and an α-olefin polymerizing catalytic component in which titanium tetra-chloride is supported by a carrier obtained by pulverizing a magnesium-containing halide together with an electron donor compound or the like.

Further, recent Japanese patent application laying open publications relative to α-olefin polymerizing supported catalytic components of the Ziegler type to which the present invention also relates include Japanese Patent Application Laid-Open No. 55-58207 and Japanese Patent Application Laid-Open No. 55-133408. The Japanese Patent Application Laid-Open No. 55-58207 discloses an α-olefin polymerizing catalytic component in which a solid product obtained by allowing an organo-magnesium compound to react with a halogenating agent other than a halogenated titanium compound is treated with an electron donor compound not containing active hydrogen and with another electron donor compound containing active hydrogen; and then the product thus treated is further treated with a halogenated titanium compound. Another Japanese Patent Application Laid-Open No. 55-133408 discloses an olefin (co-) polymerizing method in which a three-component catalyst composition consisting of an α-olefin polymerizing catalytic component, an organo-metallic compound and a Lewis base is used; and the α-olefin polymerizing catalytic component is obtained by treating a solid organo-magnesium compound with an aromatic alcohol and a Lewis base and by further treating the treated product with a titanium compound and a vanadium compound. In accordance with these methods of prior art, however, the polymerizing activity and stereospecific polymer productivity of the catalyst are still low. Besides, the bulk density of the polymer obtainable therefrom is also unsatisfactorily low. Accordingly, in the α-olefin polymer thus obtained, there remains a considerable amount of residual catalyst, which presents various problems in terms of the stability, workability, etc. of the α-olefin polymer. These problems then necessitates provision of some additional facilities for the removal of the residual catalyst and the stabilization of the polymer. In addition to these problems, the low productivity for a stereospecific polymer necessitates provision of some further facility for extraction and removal of atactic polypropylene which is produced as by-product. This requires a great amount of energy. Further, since the bulk density of the polymer produced is low, the polymer is very difficult to handle in carrying out a molding process, etc. It is a further shortcoming of the α-olefin polymer obtained by using the α-olefin polymerizing catalytic component that the particles of the polymer do not show sufficient resistance to disintegration during processes such as transfer by pumping, centrifugal separation and the like that follow the polymerization. The polymer particles readily disintegrate and tend to produce fine powder or amorphous particles. Besides, the catalytic component itself also does not have much resistance to disintegration. These shortcomings can be improved by a higher degree of polymerizing activity which can be expressed by the weight of the α-olefin polymer produced per unit weight of the catalytic component; a higher degree of stereospecific polymer productivity; a higher bulk density of the polymer produced; and a greater resistance to disintegration of the catalyst. Such improvements when would obviate the necessity of the facilities for removal of the above stated residual catalyst and for extraction and removal of the atactic polypropylene and thus would permit reduction in the production cost required in the manufacture of an α-olefin polymer.

The present inventors, therefore, strenuously conducted studies for obtaining an α-olefin polymerizing catalytic component that has a higher degree of polymerizing activity than the above stated prior art α-olefin polymerizing catalytic component and would give an α-olefin polymer which is of excellent stereospecificity, of high bulk density, of spherical particle shape and does not readily disintegrate. These studies have led to the present invention which is based on the following finding that: An α-olefin polymerizing catalytic component obtained by treating, with an alcohol and/or phenol, a solid product which is obtained by allowing an organo-magnesium compound or a mixture of an organo-magnesium compound and an organo-aluminum compound or their reaction product to react, in the presence of an electron donor compound and an α-olefin, with a mixture of a halogenating agent other than a halogenated titanium compound and a titanium compound or their reaction product, or by further treating the treated matter thus obtained with a halogenated titanium compound has a high degree of polymerizing activity for the polymerization of an α-olefin; has a high degree of stereospecificity; and gives a polymer which is of a high bulk density, spherical in morphology and has sufficient resistance to disintegration.

SUMMARY OF THE INVENTION

It is therefore an object of the invention to provide an α-olefin polymerizing catalytic component which is obtained through the following essential processes: An organo-magnesium compound or a mixture of an organo-magnesium compound and an organo-aluminum compound or their reaction product is allowed to react, in the presence of an electron donor compound and an α-olefin, with a mixture of a halogenating agent other than a halogenated titanium compound and a titanium compound or their reaction product to obtain a solid product. Then, the solid product thus obtained is treated with an alcohol and/or phenol. After that, the treated product may be further treated with a halogenated titanium compound. The particle shape of the catalytic component thus obtained and a polymer obtainable by using it is spherical respectively. The catalytic component excels the conventionally known catalytic components in polymerizing activity and stereospecific polymer productivity. Besides, the bulk density of the polymer to be obtained and the resistance to disintegration of the polymer and the catalytic component which have hitherto presented problems with the prior art Ziegler type supported catalytic components can be improved to a substantial extent by the catalytic component. In addition to these advantages, the catalytic component according to the invention facilitates adjustment of the molecular weight of the polymer with hydrogen. The polymer obtained from the use of the catalytic component of the invention, therefore, is marketable as it is by virtue of these advantages.

It is another object of the invention to provide a method for homo- or co-polymerization of an α-olefin which is carried out either in the presence of a catalyst component consisting of the catalytic component thus obtained and an organo-aluminum compound or with a concomitant electron donor compound used in addition to this catalyst component.

The above objects and features of the invention will be apparent from the following detailed description of the present invention.

DETAILED DESCRIPTION OF THE INVENTION

The electron donor compound usable in accordance with the invention is selected from the group consisting of an organic acid ester, an organic ether compound, a polysiloxane, a thioether, a ketone and an amine and is used either singly or in the form of a mixture of more than one kind.

Taking aliphatic carboxylic acid esters and aromatic carboxylic acid esters as specific examples of the organic acid ester, the organic acid ester may be selected from the group consisting of a primary alkyl ester of saturated aliphatic carboxylic acid such as methyl formate, ethyl acetate, n-amyl acetate, 2-ethyl-hexyl acetate, n-butyl formate, ethyl butyrate, ethyl valerate, etc.; an akenyl ester of saturated aliphatic carboxylic acid such as vinyl acetate, allyl acetate, etc.; a primary alkyl ester of unsaturated aliphatic carboxylic acid such as methyl acrylate, methyl methacrylate, n-butyl crotonate, etc.; a polyvalent carboxylic acid ester such as 2-ethyl hexyl adipate, etc.; a lactone such as γ-butyro lactone, δ-valero lactone, etc.; aromatic carboxylic esters including a primary alkyl ester of benzoic acid such as methyl benzoate, ethyl benzoate, n-propyl benzoate, n- or iso-butyl benzoate, n- or iso-amyl benzoate, n-hexyl benzoate, n-octyl benzoate, 2-ethyl hexyl benzoate, etc.; a primary alkyl ester of toluic acid such as methyl toluate, ethyl toluate, n- or iso-butyl toluate, 2-ethyl hexyl toluate, etc.; a primary alkyl ester of anisic acid such as methyl anisate, ethyl anisate, n-propyl anisate, etc.; a primary alkyl ester of naphthoic acid such as methyl naphthoate, ethyl naphthoate, n-butyl naphthoate, 2-ethyl hexyl naphthoate, etc.; an aromatic lactone such as cumarin, phthalide, etc.; and so on. Of these esters, use of methyl benzoate, ethyl benzoate, methyl toluate, ethyl toluate, ethyl anisate, methyl naphthoate and ethyl naphthoate is preferable.

The organic ether compound that can be used as electron donor in accordance with the invention is a compound having an ether bond expressed by a generic formula of $R^2OR^3$ (wherein $R^2$ and $R^3$ represent either the same or different hydrocarbon groups each having 1 to 15 carbon atoms) or a polyether having at least two of such ether bonds within the same molecule or a cyclic ether forming a ring within the ether molecule thereof. More specifically, the organic ether compound may be selected from the group consisting of an aliphatic ether such as ethyl ether, propyl ether, iso-propyl ether, butyl ether, iso-butyl ether, amyl ether, iso-amyl ether, hexyl ether, octyl ether, decyl ether, dodecyl ether, methyl propyl ether, methyl isopropyl ether, methyl butyl ether, methyl iso-butyl ether, methyl amyl ether, methyl iso-amyl ether, methyl hexyl ether, ethyl propyl ether, ethyl iso-propyl ether, ethyl butyl ether, ethyl iso-butyl ether, ethyl amyl ether, ethyl iso-amyl ether, ethyl hexyl ether, vinyl ether, allyl ether, methyl allyl ether, ethyl vinyl ether, ethyl allyl ether, butyl vinyl ether, etc.; an aromatic ether, such as phenetole, butyl phenyl ether, amyl phenyl ether, methoxy toluene, benzyl ethyl ether, phenyl benzyl ether, naphthyl ether, veratrol, etc.; a cyclic ether such as propylene oxide, tri-methylene oxide, epoxy butane, dioxane, trioxane, furan, methyl furan, tetra-hydrofuran, tetra-hydropyrane, cineole, etc.; and a poly ether such as dimethoxy ethane, diethoxy ethane, dibutoxy ethane, diethylene glycol dimethyl ether, diethylene glycol diethyl ether, diethylene glycol dibutyl ether, methylal, acetal, glycerol ether, crown ether, etc.

The poly-siloxane usable as electron donor in accordance with the invention is ether a siloxane polymer having a repeating unit expressed by the generic formula of

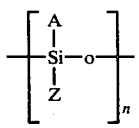

(wherein A and Z represent groups bondable to silicon such as hydrogen, an alkyl group of carbon number 1 to 8, an aryl group of carbon number not exceeding 10, a halogen, an alkoxyl group of carbon number 1 to 8, an aryloxy group of carbon number not exceeding 10 or an aliphatic acid residual group of carbon number not exceeding 20; and n represents a number between 3 and 10000) or a siloxane polymer having two or more kinds of the above stated repeating units distributed in various ratios within the molecule thereof. More specifically, the poly-siloxane may be selected from the group consisting of organic poly-siloxanes including, for example, an alkyl siloxane polymer such as octa-methyl tri-siloxane, octa-ethyl cyclo-tetra-siloxane, dimethyl polysiloxane, methyl ethyl poly-siloxane, etc.; an aryl siloxane polymer such as hexa-phenyl cyclo-tri-siloxane, di-phenyl polysiloxane, etc.; an alkaryl siloxane polymer such as diphenyl hexa-methyl tetra-siloxane, methyl phenyl poly-siloxane, etc.; a halo-alkyl siloxane such as 1,5-dichloro hexa-methyl tri-siloxane, 1,7-dichloro octa-methyl tetra-siloxane, etc.; an alkoxy siloxane polymer such as dimethoxy poly-siloxane, diethoxy poly-siloxane, etc.; and an aryloxy siloxane polymer such as di-phenoxy poly-siloxane, etc.

The thio-ether usable in accordance with the present invention is a compound expressed by a generic formula of $R^4SR^5$ (wherein $R^4$ and $R^5$ respectively represent hydrocarbon groups of carbon number 1 to 20). The thio-ether may be selected from the group consisting of diethyl thio-ether, di-n-propyl thio-ether, di-n-butyl thio-ether, di-n-amyl thio-ether, di-n-hexyl thio-ether, di-n-octyl thio-ether, di-n-decyl thio-ether, methyl phenyl thio-ether, ethyl phenyl thio-ether, di-phenyl thio-ether, di-tolyl thio-ether, di-benzyl thio-ether, di-aryl thio-ether, aryl phenyl thio-ether, etc.

The organic ketone usable in accordance with the invention is a compound expressed by a generic formula or $R^6COR^7$ (wherein $R^6$ and $R^7$ respectively represent hydrocarbon groups). The hydrocarbon group is, for example, an alkyl group of carbon number 1 to 15 such as methyl, ethyl, propyl, butyl, octyl, or an aryl group of carbon number not exceeding 15 such as phenyl, tolyl, xylyl, etc., or an aralkyl group of carbon number not exceeding 15 such as benzyl. More specifically, the organic ketone may be selected from the group consisting of an aliphatic ketone such as acetone, methyl ethyl ketone, di-butyl ketone, di-pentyl ketone, di-octyl ketone, etc.; and an aromatic ketone such as aceto-phenone, benzo-phenone, etc.

The amine usable in accordance with the invention is a compound expressed by the generic formula of

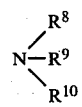

(wherein $R^8$ represents a hydrocarbon group and $R^9$ and $R^{10}$ respectively represent either hydrogen or hydrocarbon groups). Examples of such hydrocarbon groups include an alkyl group of carbon number 1 to 15 such as methyl, ethyl, butyl, propyl, octyl, etc.; an aryl group of carbon number not exceeding 15 such as phenyl, tolyl, xylyl, etc.; and an aralkyl group of carbon number not exceeding 15 such as benzyl. The amine may be selected from the group consisting of an aliphatic primary, secondary or tertiary amine such as di-ethyl amine, tri-ethyl amine, n-propyl amine, di-n-propyl amine, tri-n-propyl amine, n-butyl amine, di-n-butyl amine, tri-n-butyl amine, n-octyl amine, di-n-octyl amine, etc.; and an aromatic primary, secondary or tertiary amine such as aniline, N-methyl aniline, N,N-di-methyl aniline, di-phenyl amine, tri-phenyl amine, N,N-di-methyl benzyl amine, etc. In addition to these amines, a compound having at least two nitrogen atoms of amine in the molecule thereof, such as tetra-methyl methylene di-amine, ethylene di-amine, tetra-methyl ethylene di-amine, tetra-ethyl ethylene di-amine, etc. is also usable for the purpose of the invention.

The quantity in which the electron donor compound is to be used varies with the kind of the donor compound. Generally, however, the electron donor is used in quantity at least 0.001 mol, preferably more than 0.01 and most preferably 0.1 mol or more to 1 mol of the organo-magnesium compound. Use of the electron donor compound in quantity less than 0.001 mol hardly gives a usable catalytic component because of low stereospecific polymer productivity of the catalytic component. Although there is no particular upper limit to the quantity of the donor, use of more than 20 mol of it does not give any salient increase in the effect thereof. It is, therefore, preferable to use the electron donor in quantity not exceeding 20 mol.

In accordance with the present invention, an organo-magnesium compound or a mixture of an organo-magnesium compound and an organo-aluminum compound or a reaction product between them is allowed to react with a mixture or a reaction product of a halogenating agent other than a halogenated titanium compound and a titanium compound. An α-olefin which is allowable to be present at the reaction is an organic compound expressed by a generic formula of $CH_2=CHR''$ (wherein $R''$ represents hydrogen or a hydrocarbon group having 1 to 6 carbon atoms) and may be selected from the group consisting of ethylene, propylene, butene-1, 4-methyl pentene-1, hexene-1, styrene, etc. One kind of or a mixture of more than two kinds of the α-olefin can be used for the above stated reaction. Further, hydrogen is allowable to be concomitant during the reaction. In carrying out the reaction, the α-olefin is introduced either into the gaseous phase or liquid phase of the reaction system. The partial pressure of the α-olefin in the gaseous phase of the reactor is less than 3 kg/cm², preferably less than 2 kg/cm² and more preferably less than 1 kg/cm². There is no specific lower limit to the partial pressure. The effect of the invention is still obtainable at pressure close to zero.

The organo-magnesium compound or the mixture or reaction product of an organo-magnesium and an organo-aluminum compound to be used is an organo-magnesium compound in a state of solution expressed by a generic formula $R^1MgX'$ which will be described below or a mixture or reaction product in a state of solution obtained from an organo-magnesium compound expressed by a generic formula of $R^1MgX'$ and an organo-aluminum compound expressed by a generic formula of $AlR_nX_{3-n}$.

The organo-magnesium compound usable in accordance with the invention is expressed by the generic formula of $R^1MgX'$ (wherein $R^1$ represents a hydrocarbon group having 1 to 20 carbon atoms and $X'$ either a halogen atom selected from the group consisting of chlorine, bromine and iodine or a hydrocarbon group having 1 to 20 carbon atoms). The organo-magnesium compound may be selected from the group consisting of diethyl magnesium, di-n-propyl magnesium, diisopropyl magnesium, diisoamyl magnesium, isoamyl ethyl magnesium, isoamyl-n-propyl magnesium, di-n-amyl magnesium, di-n-amyl magnesium, n-amyl-n-propyl magnesium, n-butyl-t-butyl magnesium, n-butyl propyl magnesium, di-butenyl magnesium, di-n-butyl magnesium, n-butyl ethyl magnesium, n-butyl-sec-butyl magnesium, di-t-butyl magnesium, di-sec-butyl magnesium, dicyclopentadienyl magnesium, di-n-hexyl magnesium, n-hexyl ether magnesium, bis(methyl cyclopentadienyl) magnesium, dihexynyl magnesium, dicyclohexyl magnesium, dibenzyl magnesium, bis(phenylethyl) magnesium, di-cinnamyl magnesium, n-octyl magnesium, di-n-octyl magnesium, di-n-decyl magnesium, methyl magnesium chloride, methyl magnesium bromide, methyl magnesium iodide, ethinylene magnesium bromide, vinyl magnesium chloride, vinyl magnesium bromide, ethyl magnesium chloride, ethyl magnesium bromide, ethyl magnesium iodide, allyl magnesium chloride, propenyl magnesium bromide, isopropenyl magnesium bromide, n-propyl magnesium chloride, n-propyl magnesium bromide, isopropyl magnesium chloride, isopropyl magnesium bromide, 1-methyl propenyl magnesium bromide, tetramethylene magnesium di-bromide, t-butyl magnesium chloride, n-butyl magnesium chloride, sec-butyl magnesium chloride, cyclopentadienyl magnesium chloride, cyclopentadienyl magnesium bromide, p-phenylene magnesium dibromide, phenyl magnesium chloride, phenyl magnesium bromide, styryl magnesium chloride, styryl magnesium bromide, 1-methyl-2,2-diphenyl cyclopropyl magnesium bromide, amyl magnesium chloride, hexyl magnesium chloride, benzyl magnesium chloride, octyl magnesium chloride, decyl magnesium chloride, etc. Among these organo-magnesium compounds, use of n-butyl ethyl magnesium, n-hexyl ethyl magnesium, di-n-hexyl magnesium, n-octyl magnesium, ethyl magnesium chloride, di-n-butyl magnesium, di-n-octyl magnesium, ethyl magnesium chloride, n-butyl magnesium chloride, n-hexyl magnesium chloride or n-octyl magnesium chloride is preferable in respect to ease of use.

The organo-aluminum compound usable in accordance with the invention is expressed by the generic formula of $AlR_nX_{3-n}$ (wherein R represents a hydrocarbon group having 1 to 20 carbon atoms; X a halogen atom selected from the group consisting of fluorine, chlorine, bromine and iodine or a hydrogen atom; and n a real number of $0 < n \leq 3$). The organo-aluminum compound may be selected from the group consisting of trimethyl aluminum, triethyl aluminum, tri-n-propyl aluminum, tri-n-butyl aluminum, triisobutyl aluminum, tri-n-hexyl aluminum, tri-2-methyl pentyl aluminum, tri-n-octyl aluminum, tri-n-decyl aluminum, diethyl aluminum chloride, di-n-propyl aluminum chloride, diisobutyl aluminum chloride, methyl aluminum sesqui-chloride, ethyl aluminum sesqui-chloride, ethyl aluminum dichloride, isobutyl aluminum dichloride, diethyl aluminum fluoride, diethyl aluminum bromide, diethyl aluminum iodide, diethyl aluminum hydride, diisobutyl aluminum hydride, isoprenyl aluminum, etc. Among these organo-aluminum compounds, use of trialkyl aluminum is most preferable.

In the case of the mixture or reaction product obtained from the organo-magnesium compound and the organo-aluminum compound, the mixing ratio of the organo-aluminum compound to 1 mol of the organo-magnesium compound is less than 10 mol, preferably less than 2 mol and more preferably between 0.1 and 1 mol.

In accordance with the invention, the organo-magnesium compound or the mixture or reaction product obtained from the organo-magnesium compound and the organo-aluminum compound is dissolved in a solvent selected from the group consisting of an aliphatic hydrocarbon such as hexane, heptane, kerosine, etc.; alicyclic hydrocarbon such as cyclohexane, methyl cyclohexane, etc.; an aromatic hydrocarbon such as benzene, toluene, xylene, etc.; one of the above mentioned organic ether compound; one of the above mentioned amines; and a mixture of them. The compound is thus used in a state of solution.

In preparing the organo-magnesium compound or the mixture or reaction product obtained from the organo-magnesium compound and the organo-aluminum compound, each of the organo-metallic compounds is added to the above mentioned solvent.

Next, the halogenating agent other than a halogenated titanium compound to be used in cases where the organo-magnesium compound is used alone is a reagent that is capable of replacing the bond of Mg-hydrocarbon group in the organo-magnesium compound with the bond of Mg-halogen. To be more specific, the halogenating agent in such a case may be selected from the group consisting of a halosilane such as silicon tetrachloride, trichloro silane, monomethyl dichloro silane, dimethyl chloro silane, ethyl dichloro silane, n-propyl dichloro silane, vinyl dichloro silane, n-butyl dichloro silane, phenyl dichloro silane, benzyl dichloro silane, allyl dichloro silane, monomethyl monochloro silane, monoethyl monochloro silane, trimethyl trichloro silane, etc.; an organo-aluminum halide such as diethyl aluminum chloride, ethyl aluminum chloride, ethyl aluminum sesqui-chloride, dimethyl aluminum chloride, methyl aluminum dichloride, methyl aluminum sesqui-chloride, propyl aluminum dichloride, dipropyl aluminum chloride, etc.; thionyl chloride; a halogenated hydrocarbon or a carbon halide such as chloroform, hexachloro ethane, carbon tetrachloride, carbon tetrabromide, carbon tetraiodide, t-butyl chloride, etc.; a metal halide such as $AlCl_3$, $AlBr_3$, $SnCl_4$, $BCl_3$, $SbCl_3$, $ZnCl_2$, etc.; a hydrogen halide such as hydrogen chloride; and a halogen such as chlorine. In the case of the solution mixture or reaction product obtained from the organo-magnesium compound and the organo-aluminum compound, the halogenating agent is a reagent capable of replacing the bond of Mg-hydrocarbon group and the bond of Al-hydrocarbon in the mixture or reaction product with the bond of Mg-halogen and the bond of Al-halogen. More specifically, the halogenating agent may be selected from the group consisting of all of the reagents mentioned above with respect to the sole use of the organo-magnesium compound with the exception of organo-aluminum halides. In either case, however, use of chloroform, carbon tetrachloride or hexachloro ethane is preferable in respect of economy, ease of handling and catalytic properties.

The titanium compound to be used in accordance with the invention is a tetravalent alkoxy titanium halide expressed by the generic formula of Ti$(OR^{12})_n X^2_{4-n}$ (wherein $R^{12}$ represents a hydrocarbon group of carbon number 1 to 10; $X^2$ a halogen atom selected out of the group consisting of chlorine, bromine and iodine; and n a real number of $0 \leq n \leq 4$), a compound obtained by reducing the tetravalent alkoxy titanium halide with an organo-metallic compound, or various kinds of titanium trihalides obtained by reducing titanium tetrahalide with hydrogen, aluminum, titanium or an organo-metallic compound. More specifically, the titanium compound is selected from the group consisting of $TiCl_4$, $TiBr_4$, $TiI_4$, $Ti(C_2H_5O)Cl_3$, $Ti(C_2H_5O)_2Cl_2$, $Ti(C_2H_5O)_3Cl$, $Ti(C_2H_5O)_4$, $Ti(iso-C_3H_7O)Cl_3$, $Ti(iso-C_3H_7O)_2Cl_2$, $Ti(iso-C_3H_7O)_4$, $Ti(C_4H_9O)Cl_3$, $TiCl_3$, $TiCl_3.1/3AlCl_3$, etc. Further, a solid titanium compound such as $TiCl_3.1/3AlCl_3$ may be dissolved in a solvent such as the afore-mentioned organic ether compound and may be used in a state of solution.

In accordance with the present invention, the organo-magnesium compound or the mixture or reaction product obtained from the organo-magnesium compound and the organo-aluminum compound is mixed with and allowed to react with the mixture or reaction product obtained from the titanium compound and a halogenating agent other than a halogenated titanium compound in the presence of the electron donor compound and the α-olefin. The mixing may be carried out either by adding the mixture or reaction product obtained from the titanium compound and the halogenating agent other than a halogenated compound to the organo-magnesium compound or the mixture or reaction product obtained from the organo-magnesium compound and the organo-aluminum compound, or vice versa, or by simultaneously adding the two to the above mentioned hydrocarbon solvent with stirring. Generally, organo-magnesium compounds are viscous though the viscosity varies with the kind and concentration thereof. In handling the above stated organo-magnesium compound or the mixture or reaction product obtained from the organo-magnesium compound and the organo-aluminum compound, therefore, it is preferable to have the mixture or reaction product of the halogenating agent other than a halogenated titanium compound and the titanium compound added to and mixed with a solution of the organo-magnesium compound or the mixture or reaction product of the organo-magnesium compound and the organo-aluminum compound with the former either diluted with a hydrocarbon or an inert gas or not diluted.

The concentration of the organo-magnesium compound or the mixture or reaction product of the organo-magnesium compound and the organo-aluminum compound in a solvent varies with the structure of the organo-magnesium compound expressed by the generic formula $R^1MgX'$ as well as with the number of carbon atoms and the halogen atom in $R^1$ and $X'$. However, the concentration of the organo-magnesium compound in the solvent is less than 50 wt %, preferably less than 45 wt % and more preferably less than 40 wt %. Since the organo-magnesium compound is viscous as mentioned above, concentration exceeding 50 wt % causes the solvent in which the organo-magnesium compound is dissolved to become too viscous for easy operations such as stirring, etc. While there is no specified lower limit to the concentration, the concentration of the organo-magnesium compound is preferably above 0.1 wt % in order to ensure sufficient productivity of the catalytic component.

The electron donor compound is preferably mixed with the organo-magnesium compound prior to mixing the electron donor compound into the mixture or reaction product of the halogenating agent other than a halogenated titanium compound and the titanium compound. Therefore, the electron donor compound is added to the solvent in which the organo-magnesium compound or the mixture or reaction product of the organo-magnesium compound and the organo-aluminum compound is dissolved. Or, as an alternative way, the organo-magnesium compound or the mixture or reaction product of the organo-magnesium compound and the organo-aluminum compound is first dissolved in the electron donor compound before it is diluted with the solvent.

The halogenating agent other than a halogenated titanium compound is used for the purpose of replacing the hydrocarbon group in the organo-magnesium compound or the mixture or reaction product of the organo-magnesium compound and the organo-aluminum compound with halogen atoms. Although it varies with the kind thereof, the mixing quantity of the halogenating agent is 0.01 to 10 mol, preferably 0.05 to 5 mol and more preferably 0.1 to 3 mol per mol of the hydrocarbon group of the organo-magnesium compound or the mixture or reaction product obtained from the organo-magnesium compound and the organo-aluminum compound.

The titanium compound is used for the purpose of forming a carrier essentially comprising a poly-α-olefin, a magnesium halide and an electron donor compound. The titanium compound is an indispensable reagent for the manufacture of the catalytic component having the afore-mentioned advantages which are obtained through polymerization of the α-olefin allowed to be present during the reaction of the solution of the organo-magnesium compound or the mixture or reaction product of the organo-magnesium compound and the organo-aluminum compound with the above stated halogenating agent. The mixing amount of the titanium compound to 1 mol of the hydrocarbon group of the organo-magnesium compound or the mixture or reaction product obtained from the organo-magnesium compound and the organo-aluminum compound is 0.001 to 0.4 mol, preferably 0.005 to 0.2 mol and more preferably 0.01 to 0.1 mol.

The halogenating agent and the titanium compound are preferably mixed and allowed to react either in the presence of the above stated hydrocarbon solvent or beforehand.

There is no particular limit to the temperature at which the organo-magnesium compound or the mixture or reaction product of the organo-magnesium compound and the organo-aluminum compound is allowed to react with the mixture or the reaction product of the halogenating agent other than a halogenated titanium compound and the titanium compound. However, since the reaction vigorously takes place at high temperature, the reaction is preferably carried out at a relatively low temperature at which the reaction proceeds not too slowly. The reaction is therefore carried out at a temperature between −50° and 100° C., preferably between −30° and 80° C. and more preferably between −20° and 50° C. In order to have the reaction completely carried out, it is preferable, though it depends on the reaction temperature, to have a stirring and mixing operation further continued over an additional period of 0.1 to 10 hours at the same temperature or with the temperature raised within a range not exceeding 150° C. either by continuing or discontinuing the introduction of the α-olefin after completion of mixing of the mixture or reaction product of the halogenating agent and the titanium compound.

In accordance with the invention, the solid product thus obtained through the above described reaction is treated with an alcohol and/or a phenol. This treatment is preferably carried out in one or more kinds of solvent of hydrocarbon selected from the group consisting of an aliphatic hydrocarbon such as hexane, heptane, octane, decane, kerosine, etc.; an alicyclic hydrocarbon such as cyclohexane, methyl cyclohexane, decalin, etc.; and an aromatic hydrocarbon such as benzene, toluene, xylene, tetralin, etc. In carrying out this treatment, the solid reaction product is suspended in the hydrocarbon solvent and then the alcohol and/or phenol is generally added either without diluting it or by diluting it with a hydrocarbon to an extent between 1 vol % and 100 vol %.

The alcohol to be used in accordance with the invention is either a mono-hydric alcohol expressed by a generic formula of $R^{13}$ OH (wherein $R^{13}$ represents an alkyl, alkenyl or aralkyl group of carbon number 1 to 20) or a poly-hydric alcohol having at least 2 hydroxyl groups. More specifically, the alcohol is selected from the group consisting of methanol, ethanol, n-propanol, isopropanol, n-butanol, sec-butanol, t-butanol, n-amyl alcohol, isoamyl alcohol, hexanol, heptanol, octanol, decyl alcohol, allyl alcohol, vinyl alcohol, benzyl alcohol, glycerol, ethylene glycol, propylene glycol, etc.

The phenol usable in accordance with the invention is selected from the group consisting of phenol, cresol, xylenol, naphthol, butyl hydroxytoluene, chlorophenol, bromophenol, 2,4,6-tri-chlorophenol, 2,4,6-tri-bromophenol, 2,4-di-nitrophenol, guaiacol, anol, eugenol, isoeugenol, saligenin, carvacrol, thymol, hydroxy acetophenone, hydroxy di-phenyl, cyclohexyl phenol, catechol, resorcin, hydroquinone, pyrogallol, hydroxy hydroquinone, phloroglucinol, amino phenol, etc.

The length of time required for the treatment to be carried out with the alcohol and/or phenol varies with the treating temperature and the kind of the alcohol and/or phenol employed and is thus not particularly limited. However, the preferred length of time for the treatment is between 0.1 and 10 hours. A length of treatment time less than 0.1 hour will not give any effect of the treatment. However, treatment over a period exceeding 10 hours will not give any salient increase in the attainable effect. Meanwhile, there is also no particular restriction to the temperature of the treatment. However, if the alcohol and/or phenol remains in a solid state, the treatment would take an excessively long period of time. Besides, in such a case, precipitative adsorption on the surface of the solid product would hamper a subsequent treatment or degrade the catalytic properties obtained. Therefore, the treatment must be carried out at least at a temperature above the melting point of the alcohol and/or phenol employed. Further, the treatment is preferably carried out at a temperature not exceeding the boiling point of the alcohol and/or phenol employed.

The quantity of the alcohol and/or phenol to be used for the treatment is generally 0.01 to 10 mol, preferably 0.05 to 5 mol and most preferably 0.1 to 3 mol per mol of magnesium existing in the above stated solid product to be treated. The effect of the treatment carried out with the alcohol and/or phenol is manifest chiefly in the polymerizing activity and the stereospecific polymer productivity shown at the time of polymerization of an α-olefin. In the case of catalytic components obtained without this treatment, the polymerization activity and the stereospecific polymer productivity tend to become lower and particularly the latter becomes low.

After the solid product has been thus treated with the alcohol and/or phenol, the product (hereinafter will be called the alcohol treated product) is subjected to a solid-liquid separating process carried out by decantation or filtration. After washing with a hydrocarbon, a catalytic component is obtained either in a state of slurry in the hydrocarbon or in a dried state.

However, the alcohol treated product may be further treated with a halogenated titanium compound. This treatment is carried out either after the alcohol treated product has been dried with heating under reduced pressure or without such a drying process. Hereinafter the alcohol treated solid product which has undergone the above stated drying process will be called the dried product. This drying process of heating under reduced pressure is carried out over a period of 1 to 10 hours at absolute pressure not exceeding 500 mmHg and at a temperature between 10° and 100° C. The catalytic properties such as polymerizing activity, etc., can be further improved through this drying process.

The treatment with the halogenated titanium compound can be carried out in accordance with a known method. For example, it is carried out by allowing the alcohol treated product to be suspended either in the halogenated titanium compound or in a hydrocarbon solvent having the halogenated titanium compound dissolved therein in a manner generally practised. In the latter case, however, it is preferable to have a high concentration of the halogenated titanium compound. Further, this treatment may be carried out with concomitance of a known electron donor compound there.

The halogenated titanium compound that is usable in accordance with the invention may be selected from the group consisting of titanium tetrachloride, titanium tetrabromide, titanium tetraiodide, titanium trichloride, a solid solution of titanium trichloride and aluminum trichloride, ethoxy titanium trichloride, propoxy titanium trichloride, butoxy titanium trichloride, dibutoxy titanium trichloride, dibutoxy titanium dichloride, tributoxy titanium monochloride, etc. Among these compounds, use of titanium tetrachloride is most preferable.

To 1 mol of magnesium contained in the alcohol treated product or the dried product, the quantity of the halogenated titanium compound to be used for the treatment is at least 0.01 mol, preferably 1.0 mol or more and more preferably 10 mol or more. This treatment is normally carried out over a period of 0.1 to 10 hours at a temperature between room temperature and 150° C. After completion of the treatment, solid-liquid separation is carried out either by decantation or filtration.

The halogenated titanium compound sticking to the surface of the solid thus obtained is washed off with a hydrocarbon such as hexane, kerosine, cyclohexane, methyl cyclohexane, benzene, tolutene, xylene, etc. Then, a catalytic component is obtained either in a slurry like state in the hydrocarbon or in a dried stated after a drying process.

The catalytic component obtained through the processes described above has a highly homogeneous size of particles which are spherical in shape and of good fluidity.

The catalytic component of the present invention can be used for the (co-) polymerization of an α-olefin in combination with an orango-aluminum compound.

In accordance with the invention, the organo-aluminum compound to be used for this purpose is a compound expressed by a generic formula of $AlR^{14}{}_nX^3{}_{3-n}$ (wherein $R^{14}$ represents a hydrocarbon group of carbon number 1 to 20; $X^3$ a halogen atom selected from the group consisting of fluorine, chlorine, bromine and iodine or a hydrogen atom; and n a real number of $0 < n \leq 3$). The organo-aluminum compound is selected from the group consisting of trimethyl aluminum, triethyl aluminum, tri-n-propyl aluminum, tri-n-butyl aluminum, triisobutyl aluminum, tri-n-hexyl aluminum, tri-2-methyl pentyl aluminum, tri-n-octyl aluminum, tri-n-decyl aluminum chloride, di-n-propyl aluminum chloride, ethyl aluminum sesqui-chloride, ethyl aluminum dichloride, isobutyl aluminum dichloride, diethyl aluminum fluoride, diethyl aluminum bromide, diethyl aluminum iodide, diethyl aluminum hydride, diisobutyl aluminum hydride, isoprenyl aluminum, etc. One kind of or a mixture of more than two kinds of these organo-aluminum compounds can be used.

The addition quantity of the organo-aluminum per mol of titanium contained in the catalytic component, as reduced to the mol number of aluminum contained in the organo-aluminum compound, Al/Ti, is preferably between 1 and 1000.

It is possible, in accordance with the invention, to allow a known electron donor compound to be concomitant in carrying out the polymerization for the purpose of further improvement in the catalytic properties, etc.

The known electron donor compound mentioned above may be selected out of the electron donor compounds mentioned in the foregoing.

The quantity of the electron donor compound to be used per mol of the organo-aluminum compound is 0.01 to 3 mol, preferably 0.05 to 2 mol and more preferably 0.1 to 1 mol.

The (co-) polymerization may be carried out by one of various processes including: A suspension polymerization process in which an aromatic hydrocarbon such as benzene, toluene, xylene, etc.; an aliphatic hydrocarbon such as hexane, heptane, octane, kerosine, etc.; or an alicyclic hydrocarbon such as cyclohexane, methyl cyclohexane, etc. is used as solvent. A liquid phase polymerization process in which a liquefied α-olefin is used as solvent. A ga phase polymerization process in which an α-olefin is polymerized in a vapor phase. As for the mode of carrying out the (co-) polymerization, it may be carried out either in a continuous mode or in a batch mode.

The α-olefin that can be (co-) polymerized by using the invented catalytic component is an organic compound expressed by a generic formula of $CH_2=CHR^{15}$ (wherein $R^{15}$ represents either hydrogen or a hydrocarbon group having 1 to 6 carbon atoms). Such organic compounds include, for example, ethylene, propylene, butene-1, 4-methyl pentene-1, styrene, etc. The molecular weight adjustment for the (co-) polymerization of such an α-olefin can be accomplished by a known method using hydrogen or diethyl zinc.

The (co-) polymerization is preferably carried out at a temperature within a range from 40° to 120° C. and under pressure between normal pressure and 100 atm and more preferably between normal pressure and 60 atm.

The polymer obtainable in accordance with the method of the present invention is highly homogeneous in particle diameter and is of excellent spherical particle shape. It has a high degree of bulk density and is in such a state that it can be marketed as it is without going through any pelletizing process.

The invention will be more clearly understood with reference to the following description of examples, in which:

The term "polymerizing activity" is indicated by a symbol A, "a heptane insoluble matter" by H.I., "an isotactic index" by I.I. and "bulk density by $\rho B$." The definition of these terms are as shown below:

A: The weight (g) of a solid polymer produced per unit time (hr), unit pressure (atm) and unit weight (g) of the catalytic component. That is: (g-polymer/g-catalytic component-hr-atm)

H.I.: A polymer insoluble in n-heptane (g)×100/solid polymer (g) ... (%)

I.I.: A polymer insoluble in n-heptane (g)×100/total polymer produced (g) ... (%)

$\rho B$: The bulk density (g/ml) of solid polymer produced as measured in accordance with the Method A of ASTM-D-1895-69.

EXAMPLE 1

1. Preparation of the catalytic component:

1-1. Preparation of the solid product: Using n-butyl magnesium as the organo-magnesium compound according to the invention, 161 ml of an n-heptane solution of n-butyl ethyl magnesium (manufactured by Texas Alkyls Inc. of U.S.A., at concentration of 0.65 mol/l) was poured into a 300 ml, four necked flask, which had the inside thereof replaced with dry nitrogen beforehand. The flask was immersed in a refrigerant to cool the solution down to 0° C. To the solution was added 2.0 ml of ethyl benzoate with stirring. Following this, a mixture consisting of 25 ml of carbon tetra-chloride and 0.77 ml of titanium tetra-choloride which had been diluted with 75 ml of n-heptane was dropped into the flask while ethylene was concurrently supplied to cause the partial pressure of the gaseous phase portion of the flask to be 0.2 kg/cm². The dropping operation was carried out over a period of one hour. After completion of it, the introduction of ethylene was stopped. Then, the solution was kept at 0° C. for 40 minutes, at normal temperature for 40 min. and at 80° C. for 60 min. to obtain a solid product.

Next, the solution was allowed to cool down to normal temperature and then the stirring operation was stopped to allow the solid product to precipitate. A supernatant liquid was removed by decantation. After this decantation, 200 ml of n-heptane was again poured into the flask and stirring, precipitation and decantation processes were respectively repeated five times to wash the solid product.

1-2. Treatment carried out with a phenol: Into the flask was poured 100 ml of n-heptane to have the above stated solid product suspended therein. While the suspension was kept at 30° C. with stirring, 100 ml of an n-heptane solution having 5 g of p-cresol dissolved therein as the phenol to be used in accordance with the invention was dropped into the suspension. Under the stirring operation, the temperature of the suspension was raised up to 80° C. and the suspension was treated over a period of 2 hours at 80° C. A solid was allowed to precipitate by stopping the stirring operation. Then, a supernatant liquid was removed by decantation. Following this, 200 ml of n-heptane was poured into the flask and stirring, precipitation and decantation processes were repeated five times respectively to wash the treated solid thus obtained.

1-3. Treatment carried out with titanium tetra-chloride: For this treatment, 80 ml of titanium tetra-chloride and the phenol treated solid were poured into a 100 ml, four necked flask which was equipped with a stirrer and the inside of which had been replaced with dry nitrogen. Under a stirring operation, and in an oil bath, temperature was raised to 140° C. and the solid was thus treated at 140° C. over a period of 2 hours. After treatment, the treated matter was allowed to cool down. Then, a cake was obtained through filtration. The cake was washed with 1 liter of n-heptane and, after washing, dried at 40° C. under reduced pressure over a period of 5 hours to obtain a catalytic component.

2. Polymerization of Propylene:

The inside of a 5 liter autoclave was replaced with dry nitrogen. Into this were put 40 mg of the above stated catalytic component, 0.5 ml of triethyl aluminum, 0.1 ml of diethyl aluminum chloride and 0.16 ml of ethyl p-anisate. Then, hydrogen was introduced into the autoclave until there obtained 0.4 kg/cm$^2$G of hydrogen pressure. After that, 1.5 kg of liquid propylene was put into the autoclave with pressure.

The inside temperature of the autoclave was raised up to 80° C. by heating. Stirring was commenced with this temperature was attained and the polymerization was considered to began at this point of time. With the inside temperature of the autoclave kept at 80° C., polymerization of propylene was carried out over a period of 2 hours. After that, stirring was stopped. Propylene gas was discharged from the reaction system to obtain a solid polymer. The results of the polymerization were: A=405, H.I.=94.2 and ρB=0.43.

EXAMPLE 2

A catalytic component was prepared and propylene was polymerized in exactly the same manner as in Example 1 except that 75 ml of an n-butyl ether solution of n-butyl magnesium chloride (concentration: 1.4 mol/l) was used in place of the n-heptane solution of the n-butyl ethyl magnesium which was used in Example 1. The results of the polymerization were: A=410, H.I.=94.4 and ρB=0.40.

EXAMPLE 3

The ethyl benzoate which was used in Example 1 was replaced with 40 ml of n-butyl ether in Example 3. With the exception of this, a catalytic component was prepared and propylene was polymerized in exactly the same manner as in Example 1. The results obtained were: A=428, H.I.=94.9 and ρB=0.43.

EXAMPLE 4

A catalytic component was prepared and propylene was polymerized in exactly the same manner as in Example 2 except that the ethyl benzoate which was used in Example 2 was not used in Example 4. The results of the polymerization were: A=419, H.I.=94.3 and ρB=0.42.

EXAMPLE 5

Propylene was polymerized in exactly the same manner as in Example 1 with the exception of that the phenol treated solid obtained in Example 1 was used as the catalytic component for the polymerization in this example. The results of polymerization were: A=360, H.I.=93.8 and ρB=0.40.

EXAMPLE 6

Propylene was polymerized in exactly the same manner as in Example 1 with the exception of that the phenol treated solid obtained in Example 2 was used as the catalytic component in this example. The results of the polymerization were: A=362, H.I.=93.9 and ρB=0.38.

EXAMPLE 7

Propylene was polymerized in exactly the same manner as in Example 1 with the exception of that the phenol treated solid obtained in Example 3 was used as the catalytic component for the polymerization of propylene in Example 7. The results of polymerization were: A=374, H.I.=9.42 and ρB=0.40.

EXAMPLE 8

Propylene was polymerized in exactly the same manner as in Example 1 with the exception of that the phenol treated solid obtained in Example 4 was used as the catalytic component for the polymerization of propylene in Example 8. The results obtained were: A=365, H.I.=93.9 and ρB=0.40.

EXAMPLE 9–12

In each of Examples 9 through 12, a catalytic component was prepared and propylene was polymerized in exactly the same manner as in Example 1, 2, 3 or 4 with the exception of that, after the treatment carried out with the phenol, the phenol treated solid was subjected to a drying process carried out under reduced pressure of 50 mmHg in absolute pressure, at 50° C., over a period of 3 hours in each of Examples 9 through 12. The results of the polymerization were as shown in Table 1 below:

TABLE 1

| Example No. | Preparation of catalytic component | A (g/g-hr-atm) | H.I. (%) | ρB (g/ml) |
|---|---|---|---|---|
| 9 | Based on Example 1 | 490 | 96.5 | 0.43 |
| 10 | Based on Example 2 | 495 | 96.7 | 0.40 |
| 11 | Based on Example 3 | 518 | 96.9 | 0.43 |
| 12 | Based on Example 4 | 506 | 96.5 | 0.42 |

EXAMPLES 13–21

In each of Examples 13 through 21, a catalytic component was prepared and propylene was polymerized in exactly the same manner as in Example 1 with the exception of that: The ethyl benzoate which was employed as electron donor compound and allowed to be concomitant in obtaining the solid product in Example 1 was replaced with each of the varied kinds of electron donor compounds in each of Examples 13 through 21 as shown in Table 2. The results of these Examples were as shown in Table 2 below:

TABLE 2

| Example No. | Electron donor compound | (ml) | A (g/g-hr-atm) | H.I. (%) | ρB (g/ml) |
|---|---|---|---|---|---|
| 13 | anisole | 20 | 430 | 94.0 | 0.41 |
| 14 | eihyl p-anisate | 5 | 401 | 94.4 | 0.40 |
| 15 | diethyl thioether | 1.0 | 418 | 94.2 | 0.42 |
| 16 | n-butyl ether | 30 | 428 | 94.4 | 0.42 |
| 17 | diethyl amine | 10 | 405 | 94.0 | 0.40 |
| 18 | chain dimethyl polysiloxane | 10 | 412 | 94.2 | 0.41 |
| 19 | hexyl ether | 15 | 429 | 94.3 | 0.42 |
| 20 | acetone | 5 | 405 | 94.1 | 0.41 |
| 21 | di-n-butyl thioether | 2.5 | 417 | 94.3 | 0.41 |

EXAMPLES 22–27

In carrying out the treatment with an alcohol and/or a phenol in each of Examples 22 through 27, p-cresol which was used in Example 1 was replaced with one of the varied kinds of alcohols and phenols shown in Table 3. With the exception of this, a catalytic component was prepared and propylene was polymerized in exactly the same manner as in Example 1. The results were as shown in Table 3 below:

TABLE 3

| Example No. | Alcohols and phenols | | A (g/g-hr-atm) | H.I. (%) | ρB (g/ml) |
|---|---|---|---|---|---|
| 22 | ethanol | 6 ml | 395 | 94.0 | 0.42 |
| 23 | n-butanol | 4.8 ml | 400 | 94.0 | 0.42 |
| 24 | n-octanol | 30 ml | 410 | 94.2 | 0.40 |
| 25 | phenol n-octanol | 1 g + 10 ml | 405 | 94.2 | 0.41 |
| 26 | guaiacol | 5 g | 408 | 94.3 | 0.42 |
| 27 | 2,4-di-methyl phenol | 10 g | 412 | 94.4 | 0.41 |

EXAMPLES 28–31

In the preparation of a solid product in each of Examples 28–31, one of varied kinds of halogenating agents was used in place of the carbon tetrachloride which was used as halogenating agents in Example 1. With the exception of that, a catalytic component was prepared and propylene was polymerized in exactly the same manner as in Example 1. The results were as shown in Table 4.

TABLE 4

| Example No. | Halogenating agent | (ml) | A (g/g-hr-atm) | H.I. (%) | ρB (g/ml) |
|---|---|---|---|---|---|
| 28 | trichloro silane | 10 | 400 | 94.0 | 0.40 |
| 29 | silicon tetrachloride | 30 | 395 | 94.1 | 0.40 |
| 30 | chloroform | 20 | 402 | 94.2 | 0.41 |
| 31 | t-butyl chloride | 45 | 405 | 94.2 | 0.40 |

EXAMPLES 32–50

In each of Examples 32 through 50, propylene was polymerized in exactly the same manner as in Example 1 except that one of the alcohol or phenol treated solids which were obtained in Examples 13 through 31 was employed as the catalytic component for the polymerization. The results were as shown in Table 5.

TABLE 5

| Example No. | Examples in which alcohol or phenol treated solids were obtained | A (g/g-hr-atm) | H.I. (%) | ρB (g/ml) |
|---|---|---|---|---|
| 32 | Example 13 | 384 | 93.5 | 0.39 |
| 33 | Example 14 | 358 | 93.7 | 0.38 |
| 34 | Example 15 | 375 | 93.6 | 0.39 |
| 35 | Example 16 | 382 | 94.0 | 0.39 |
| 36 | Example 17 | 360 | 93.5 | 0.38 |
| 37 | Example 18 | 368 | 93.7 | 0.37 |
| 38 | Example 19 | 384 | 93.9 | 0.39 |
| 39 | Example 20 | 360 | 93.6 | 0.38 |
| 40 | Example 21 | 371 | 93.9 | 0.38 |
| 41 | Example 22 | 352 | 93.5 | 0.38 |
| 42 | Example 23 | 358 | 93.5 | 0.38 |
| 43 | Example 24 | 365 | 93.7 | 0.37 |
| 44 | Example 25 | 360 | 93.7 | 0.37 |
| 45 | Example 26 | 361 | 93.9 | 0.38 |
| 46 | Example 27 | 367 | 94.0 | 0.37 |
| 47 | Example 28 | 353 | 93.5 | 0.36 |
| 48 | Example 29 | 351 | 93.6 | 0.36 |
| 49 | Example 30 | 358 | 93.7 | 0.37 |
| 50 | Example 31 | 360 | 93.7 | 0.36 |

COMPARISON EXAMPLE 1

In this comparison example, a catalytic component was prepared and propylene was polymerized in exactly the same manner as in Example 1 except that the preparation of a solid product which was carried out with ethylene supplied in Example 1 was carried out without the supply of ethylene in this case. The results were A=215, H.I.=92.4 and ρB=0.38.

COMPARISON EXAMPLE 2

First, 161 ml of the n-heptane solution of n-butyl ethyl magnesium used in Example 1 was poured into a 300 ml, four necked flask which was equipped with a stirrer and inside of which had been replaced with dry nitrogen. Into this solution was dropped at room temperature 25 ml of carbon tetrachloride which had been diluted with 75 ml of n-heptane. After dropping, while the solution was being stirred, the solution was kept at room temperature for 80 minutes and then at 80° C. for 60 minutes to obtain a solid product.

Following this, the solution was allowed to cool down to room temperature. With the solution having reached room temperature, stirring was stopped. The solid product was allowed to precipitate. A supernatant thus obtained was removed by decantation. After that, again 200 ml of n-heptane was poured into the flask. Stirring, precipitation and decantation were respectively carried out five times to wash the solid product.

Then, 100 ml of kerosine was poured into the flask to have the solid product suspended therein. The suspension was kept at 30° C. with stirring. To this suspension was dropped 100 ml of a kerosine solution in which 5 g of p-cresol and 2.0 ml of ethyl benzoate had been dissolved. Under a stirring operation, the temperature of the solution was raised up to 60° C. and the solution was kept at 60° C. over a period of 2 hours. After this treatment, stirring was stopped to allow a solid to precipitate and a supernatant was removed by decantation. With the supernatant thus having been removed, 200 ml of n-heptane was poured into the flask. Stirring, precipitation and decantation were repeated five times respectively to wash the treated solid.

Using a 100 ml, four necked flask which had the inside thereof replaced with dry nitrogen and is equipped with a stirrer, the above stated treated solid and 80 ml of titanium tetrachloride were poured into the flask. Under a stirring operation, and in an oil bath, temperature was raised up to 140° C. to effect treatment over a period of 2 hours. After this, the treated matter was allowed to cool down and was subjected to a filtration process. A cake thus obtained was washed with 1 liter of n-heptane. The cake was dried at 40° C. under reduced pressure over a period of 5 hours to obtain a catalytic component. Using this catalytic component, propylene was polymerized in accordance with a polymerization method B. The results of the polymerization were: A=218, H.I.=90.3 and ρB=0.34.

EXAMPLE 51

In this example, the n-heptane solution of n-butyl ethyl magnesium and ethyl benzoate which were used in Example 1 were replaced with 140 ml of an n-heptane solution of a complex consisting of di-n-butyl magnesium and triethyl aluminum (manufactured by Texas Alkyls Inc. of U.S.A., called MAGALA 7.5 E, Mg concentration 0.75 mol/liter) and 40 ml of n-butyl ether. With the exception of this, a catalytic component was prepared and propylene was polymerized in exactly the same manner as in Example 1. The results of the polymerization were: A=420, H.I.=94.5 and ρB=0.42.

EXAMPLE 52

In this case, the n-heptane solution of the complex consisting of di-n-butyl magnesium and tri-ethyl aluminum which was used in Example 51 was replaced with a reaction product obtained from 161 ml of an n-heptane solution of n-butyl ethyl magnesium (manufactured by Texas Alkyls Inc. of U.S.A., MAGALABEM, Mg concentration 0.65 mol/liter) and 4.3 ml of tri-ethyl aluminum. With the exception of this, a catalytic component was prepared and propylene was polymerized in exactly the same manner as in Example 1. The results of polymerization were: A=445, H.I.=94.8 and ρB=0.45.

EXAMPLE 53

The n-heptane solution of the complex consisting of di-n-butyl magnesium and triethyl aluminum which was used in Example 51 was replaced in this case with a reaction product obtained from 75 ml of an n-butyl ether solution of n-butyl magnesium chloride (concentration 1.4 mol/liter) and 4.3 ml of triethyl aluminum. With the exception of this, a catalytic component was prepared and propylene was polymerized in exactly the same manner as in Example 1. The results of polymerization were: A=410, H.I.=93.9 and ρB=0.40.

EXAMPLE 54

Propylene was polymerized in exactly the same manner as in Example 1 with the exception of that the phenol treated solid obtained in accordance with Example 51 was used as the catalytic component for the polymerization. The results of polymerization were: A=360, H.I.=93.8 and ρB=0.40.

EXAMPLE 55

Propylene was polymerized in exactly the same manner as in Example 1 with the exception of that the phenol treated solid obtained in accordance with Example 52 was used as the catalytic component for the polymerization in this case. The results of polymerization were: A=372, H.I.=94.2 and ρB=0.43.

EXAMPLE 56

Propylene was polymerized in exactly the same manner as in Example 1 with the exception of that the phenol treated solid obtained in accordance with Example 53 was used in this case as the catalytic component for the polymerization. The results were: A=354, H.I.=93.5 and ρB=0.38.

EXAMPLES 57–59

In each of Examples 57, 58 and 53, the phenol compound treated solid obtained through treatment carried out with a phenol in each of Example 51 through 53 was subjected to a drying process which was carried out at 50° C. under reduced pressure of 50 mmHg in absolute pressure over a period of 3 hours after the phenol treatment. With the exception of this, a catalytic component was prepared and propylene was polymerized in exactly the same manner as in Examples 51 through 53. The results of polymerization were as shown in Table 6 below:

TABLE 6

| Example No. | Preparation of catalytic component | A (g/g-hr-atm) | H.I. (%) | ρB (g/ml) |
| --- | --- | --- | --- | --- |
| 57 | Example 51 | 501 | 95.8 | 0.43 |
| 58 | Example 52 | 540 | 96.1 | 0.45 |
| 59 | Example 53 | 498 | 95.2 | 0.41 |

What is claimed is:
1. A catalytic component for polymerization of an α-olefin prepared by the following steps:
   (a) reacting an organo-magnesium compound, or a mixture or reaction product of the organo-magnesium compound and an organo-aluminum compound, with a mixture or reaction product of a halogenating agent other than a halogenated titanium compound and a titanium compound at a temperature between −50° C. and 100° C. in the presence of an electron doner compound and an α-olefin, to obtain a solid product; the halogenating agent being used in an amount of 0.01 to 10 mol and the titanium compound being used in an amount of 0.001 to 0.4 mol, each per mol of the hydrocarbon group of the organo-magnesium compound, or the mixture or reaction product of the organo-magnesium compound and the organo-aluminum compound; and
   (b) treating the solid product with at least one of an alcohol and a phenol in an amount of 0.01 to 10 mol per mol of magnesium existing in the solid product, for at least 0.1 hour at a temperature above the melting point of the at least one of an alcohol and a phenol.

2. A catalytic component for polymerization of an α-olefin prepared by the following steps:
   (a) reacting an organo-magnesium compound, or a mixture or reaction product of the organo-magnesium compound and an organo-aluminum compound, with a mixture or reaction product of a halogen-containing agent other than a halogenated titanium and a titanium compound at a temperature between −50° C. and 100° C. in the presence of an electron donor compound and an α-olefin, to obtain a solid product; the halogenating agent being used in an amount of 0.01 to 10 mol and the titanium compound being used in an amount of 0.001 to 0.4 mol, each per mol of the hydrocarbon group of the organo-magnesium compound, or the mixture or reaction product of the organo-magnesium compound and the organo-aluminum compound;

(b) treating the solid product with at least one of an alcohol and a phenol in an amount of 0.01 to 10 mol per mol of magnesium existing in the solid product, for at least 0.1 hour at a temperature above the melting point of the at least one of an alcohol and a phenol; and (c) treating the resulting product of step (b) with at least 0.01 mol of a halogenated titanium compound per mol of magnesium contained in the resulting product of step (b), for 0.1 to 10 hours at a temperature between room temperature and 150° C.

3. The catalytic component for polymerization of an α-olefin according to claim 1, wherein said organo-magnesium compound is in a state of solution and is expressed by a generic formula of R$^1$MgX′, in which R$^1$ represents a hydrocarbon group having 1 to 20 carbon atoms; and X′ either a halogen atom selected from chlorine, bromine and iodine or a hydrocarbon group having 1 to 20 carbon atoms.

4. The catalytic component according to claim 1 wherein said mixture or reaction product of the organo-magnesium compound and the organo-aluminum compound is a solution mixture or reaction product of an organo-magnesium compound expressed by the generic formula of R$^1$MgX′ (in which R$^1$ representing a hydrocarbon group having 1 to 20 carbon atoms and X′ either a halogen atom selected from chlorine, bromine and iodine or a hydrocarbon group having 1 to 20 carbon atoms) and an organo-aluminum compound expressed by the generic formula of AlR$_n$X$_{3-n}$ (in which R representing a hydrocarbon group having 1 to 20 carbon atoms, X either a halogen atom selected from fluorine, chlorine, bromine and iodine or hydrogen atom, and n a real number of $0 < n \leq 3$).

5. The catalytic component for polymerization of an α-olefin according to claim 2, wherein said organo-magnesium compound is in a state of solution and is expressed by the generic formula of R$^1$MgX′, in which R$^1$ represents a hydrocarbon group having 1 to 20 carbon atoms and X′ either a halogen atom selected from chlorine, bromine and iodine or a hydrocarbon group having 1 to 20 carbon atoms.

* * * * *